April 13, 1948.   A. H. GEBAUER   2,439,463
OIL-WAX SEPARATOR
Filed Dec. 18, 1943
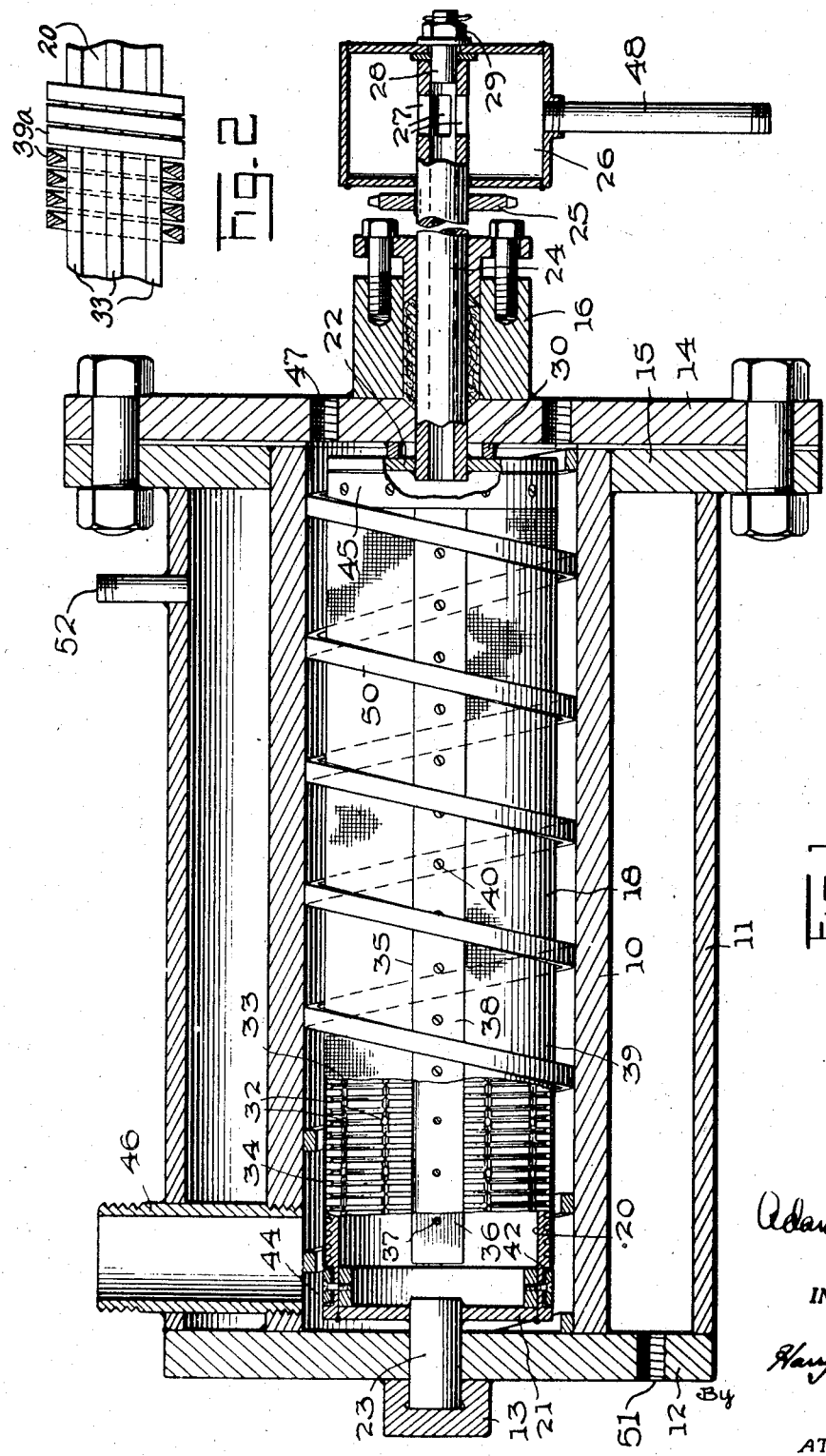
INVENTOR.
Adam H. Gebauer
Harry T. Hutton
By
ATTORNEY Patented Apr. 13, 1948

2,439,463

UNITED STATES PATENT OFFICE 2,439,463

OIL-WAX SEPARATOR

Adam H. Gebauer, Short Hills, N. J., assignor to Tide Water Associated Oil Company, Bayonne, N. J., a corporation of Delaware Application December 18, 1943, Serial No. 514,764

4 Claims. (Cl. 210—201)

This invention relates to improvements in filtering apparatus and to a method of filtering which, while having general application in the separation of solid or substantially solid materials from liquids, will be hereinafter described as a filter for and method of separating paraffin wax from an oil-wax mixture; for example, slack wax obtained in refinery procedure.

As is well known, slack wax is the cake wax resulting from filtering, usually in a Moore press, of the paraffin distillate taken in the preliminary distillation of crude oil following the chilling thereof to solidify or crystallize its wax content. To remove the oil content of the slack wax and thus re-gain the wax content thereof, the slack wax is treated according to the conventional sweating practice for the purpose of sweating out the oil or the various fractions thereof. While it is recognized that batch sweating is a laborious and time-consuming operation requiring extensive plant space, the practice has persisted despite its numerous shortcomings, chiefly because of the impracticability of the various mechanical methods advanced to replace it and the high cost of non-mechanical methods such as refining by solvents.

The present invention is directed to a pressure filter and a method of filtering which has special application to the recovery of wax from slack wax, but which is also adaptable to filter out and thereby separate the solids from other solids-liquid mixtures. In its apparatus aspects, the invention provides a filter of particular construction by which slack wax may be rapidly de-oiled in a continuous time-saving operation, and which requires minimum plant space and is capable of low-cost operation. The filter of the invention is, moreover, self-cleaning, whereby filtering proceeds at a constant rate and at high efficiency. According to the method of the invention, there is provided an improved practice of continuous filtration by which wax and like particles may be effectively separated from a liquid mixture containing the same.

Other objects will be in part obvious and in part hereinafter pointed out in connection with the following analysis of this invention wherein is illustrated an embodiment of the invention in detail. Fig. 1 sets forth in transverse section, partly in elevation, an illustrative embodiment of my invention; Fig. 2 is an elevation of a portion of the filter element, partly in section, showing a preferred edge-type filter surface having divergent-walled passages.

Referring to the drawing, reference character 10 indicates generally a filter body in the nature of a cylindrical shell which is shown to be jacketed within an outer shell 11 of substantially greater diameter, thus to provide an annular space for the circulation of a fluid heat transfer medium. As shown in the drawing, the outer shell 11 may be provided with suitable means, such as an inlet 51 for admitting the heat transfer medium to the annular space between the filter body 10 and outer shell 11, and an outlet 52 for discharge of the heat transfer medium therefrom. As a fluid heat transfer medium, water may be suitably employed, although, as is apparent to those skilled in the art, other suitable liquid fluid heat transfer mediums may be used.

As shown, the outer ends of the shells 10 and 11 are closed by suitable end plates, one end plate 12 carrying a centrally disposed cap bearing 13 for a stub shaft to be described, the other end plate 14 being secured as by bolts to a plate flange 15 welded or otherwise secured about the end of the shell 10. The plate 14 is provided with a central opening to a flange-type stuffing box 16 secured against its outer face.

Arranged within the filter body 10 is a cylindrical filter element generally designated 18 which, as shown, comprises a tubular pipe 20 closed at its ends by end plates 21, 22. Various types of filtering media can be used, such as monel screen, canvas, or the like, but the most satisfactory from the standpoint of efficient operation has been found to be a 0.003" opening edge-type filter through which the foots oil containing only traces of solid wax is extruded and which gives a high filter rate at relatively low pressures. Said edge-type filters comprise generally windings of fine wire of approximately triangular cross-section spaced from each other at the bases of the triangles to provide the openings. The filtering surface is that formed by the triangle bases, and flow though the filter is through said openings between the triangles from base to apex, thus affording diverging passages for material which has passed said openings. In this construction filter clogging is minimized. The end plate 21 carries the aforementioned axially extending stub shaft 23 which extends into the plate cap 13, being supported therein for rotation. The opposite end plate 22 carries an axially extending shaft 24 (or pipe) having a longitudinal bore, the shaft extending through the central opening of end plate 14 and through the stuffing box 16, the latter containing packing which seals the joint between the shaft and plate. Keyed to the shaft 24 beyond the stuffing box is a sprocket 25 or equivalent driving means by which the filter element is rotated on its longitudinal axis. The bored shaft 24 extends beyond the sprocket 25 into and through a collecting head 26, the shaft portion within the head being provided with a plurality of radial slots 27 communicating with the shaft bore. The bore of the shaft preferably is closed by a small diameter plug 28 which is threaded to receive an end nut 29 securing the collecting head against axial displacement relative to the bored shaft. To properly locate the filter element within body 10, the end plate 14 may carry on its inner face a spacing and wear collar 30, against which the end plate 22 of the element is adapted to bear in rotation.

The tubular pipe 20 functions as a support for a filtering medium which is carried on its outer surface. The structure of this supporting pipe may vary with different filtering media employed. Thus, when using a filtering medium such as a metal screen, canvas, or the like, the supporting pipe may suitably be of a structure such as shown in the drawing and more fully described hereinafter.

The pipe 20 of the filter element is provided with a plurality of longitudinal rows of through holes 32 connected by longitudinally extending grooves 33 of U-section cut or otherwise formed in the outer surface of the pipe to an appropriate depth. The longitudinal grooves are intersected by a series of U-shaped grooves 34 arranged spirally. These grooves and holes function as conduits to drain filtrate from the filter surface. When the filtering medium comprises a medium such as a metal screen, canvas, or the like and mainly to provide means for supporting of such mediums on the pipe 20, the outer face of the pipe is further provided with two diametrically opposed and longitudinally extending grooves 35, the material of the pipe beneath the grooves being reinforced by longitudinally extending bars 36 secured as by screws 37 against the inner face of the pipe. The grooves 35 are adapted to provide seats for longitudinal bars 38 functioning to secure a filtering medium 39 of selected material against the outer face of the perforated and grooved pipe, the bars 38 being suitably secured in place as by screws 40. Adjacent both its ends, the pipe is provided with a circular groove 42, in which seat semi-circular holding bands 44, 45 for securing the end edges of the filtering medium about the element, particularly for securing the end edges of mediums that comprise material in the form of metal mesh, canvas, or the like. However, when employing a filtering medium such as of the aforedescribed edge-type filter (comprising windings of fine wire of approximately triangular cross section) a supporting structure such as described for metal mesh or fabric is not generally required. That is, use of supporting elements comprising grooves 35, bars 36, screws 37, bars 38, screws 40, grooves 42, and bands 44 and 45 are not generally required when an edge type filtering medium as aforedescribed is used, as such a medium may be satisfactorily supported on pipe 20 by simply welding or otherwise attaching one end of the triangular cross-section wire winding to the pipe, as at one end thereof, and the other end of the winding at the opposite end of the pipe 20. This is illustrated in Fig. 2, wherein pipe 20 having longitudinal drain grooves 33 is wrapped with wire 39a of triangular cross-section as shown to form a series of turns defining, between adjacent turns, diverging-walled passages for passage of the filtrate.

As indicated in the drawings, the diameter of the filter element is substantially less than that of the inner diameter of the body 10, thus to provide an annular space which extends the length of the filter. The depth of this space, i. e., the distance between the filter and the body 10, may vary with variations in size of the device and with variations in pitch of the helical blade 50 (to be described). In any event, this space should be sufficiently small to provide proper presentation of all of the oil bearing wax particles to the vicinity of the filter element during their travel through the device as the material is worked and kneaded in such travel. The material to be filtered is supplied under pressure to said space through inlet connection 46 extending through the outer jacket. The filter is also provided with an outlet 47 for the solids separating from the material, it being observed that the liquid filtrate passing through the filtering medium to the interior of the filter element collects in the latter until it reaches the level of the bore of shaft 24 forming an outlet therefor, whereupon it flows through said shaft and is collected in the head 26, being taken off through a suitable outlet conduit 48.

According to the invention, the solid particles filtering out in the annular space provided between the filter element and body are conveyed or caused to progress along the length of the filter element to the discharge outlet 47 in such manner that they are simultaneously worked and kneaded in effective manner. Due to the fact that filtration proceeds during this working or kneading operation, liquid which would otherwise be retained by the separated solids is expressed through the filtering medium. It is a further feature of the invention that, as the separated solids are conveyed along the length of the filter element, they are compacted to a consistency such that at the discharge end of the space they form a seal preventing channeling or blow-by of unworked or only partially worked solid material through the filter.

In the illustrated embodiment of the invention, these desirable features are attained by providing a helical blade 50 on the inner surface of the shell 10 which projects into the annular space between the outer surface of the filter element and shell 10. As the filter element is rotated, the blade functions to collect the solids filtering out in said space and to direct them in an elongated path towards the discharge outlet 47. Preferably, the inner surface of the shell 10 and the working surfaces of the helical blade are machined, thereby to provide smooth surfaces for the free and easy movement of the separated solids along the filter element. The outlet 47 is of such size that it offers a restriction to the free discharge of the separated solids therethrough or, being large, the discharge line from the outlet may be provided with a valve the size of whose opening determines the consistency of the solids collecting at the discharge end of the annular space. In either case, by predetermining the rate of solids discharge in relation to the rate of the feed movement thereof, the consistency of the solids reaching the discharge end of the space is controlled, being such that the solid material itself builds up to form a seal against which the solids are fed by the blade 50. Accordingly, the separated solids are progressively worked and compacted as they are propelled along the length of the annular space, being extruded through the outlet 47 in a substantially dry state. The consistency to which the solids are compacted as aforesaid determines the depth of the seal, which latter is selected to be sufficiently shallow for a high filtering rate and at the same time sufficiently deep as to prevent channeling or blow-by of unworked or only partially worked solids through the filter.

In addition to the conveying and compacting action of the blade as aforesaid, it also serves the important purpose of continuously cleaning the filtering medium of the solids tending to collect thereon in a sense to be described, thus to maintain a high filtering rate and maximum efficiency.

While the cleaning action of the blade is dependent to some extent on the materials being filtered, the pitch of the blade, and the clearance beween the blade edge and the filtering medium, these factors can be adjusted to meet the particular conditions so as to give optimum results. The depth of the blade which determines the thickness of the mass of the solids collecting in the annular space is not believed to be critical, provided the thicker masses are held in the filter and worked within the filter for a longer time. In general, the pitch of the spiral blade determines the time or travel of the solids through the filter. Clearance between the spiral blade and the filter-medium may vary somewhat, it being observed that actual contact between the blade and the medium is to be avoided for the reason to follow.

For the filtration of oil-wax mixtures, as in de-oiling of slack wax, clearance between the blades and filter element should be relatively small for proper operation. The proper clearance for optimum results will vary somewhat with different types of filter-elements, but in the case of a given filter-element decreased clearance between the blades and filter-element is accompanied by increased filter-rates and permits use of lower pressures. For example, when using an edge-type filter-element of the kind described hereinabove having 0.003 inch filter openings satisfactory results have been obtained using clearances from about 0.1 inch down to about 0.01 inch or even lower.

These low clearances result in maintenance of a thin film or layer of wax on the filter-element which offers relatively low resistance to oil flow therethrough in operation of the device. This thin film is apparently an important factor responsible for the high filtering rate and efficient deoiling characteristics of the apparatus of this invention.

The herein described pressure filter and the method of filtering is especially adapted to the treatment of slack wax for the purpose of removing the oily constituents thereof, as has been indicated. The slack wax to be deoiled is given suitable preliminary treatment, which may consist of mixing melted and unmelted slack wax and agitating the mixture to form a slurry containing the wax particles. The slurry, which may consist of oily agglomerates of wax resembling cooked rice or oatmeal in appearance, is continuously charged to the filter at a pressure such as to provide optimum filter-rate without causing excessive extrusion of wax through the filter medium with the oil. During the filtering operation the temperature of the wax is adjusted (as by circulation of heat-transfer fluid in the described jacket) so that the wax agglomerates in the space between the filter body and filter-element will filter out and be compacted as a plastic wax mass or product as they are moved along beween the spirals of the blade to discharge. Due to the pressure and the feeding action resulting from relative movement between the filter-element and the blade, the wax in its movement to discharge is progressively compacted, which further reduces its oil content. At the discharge end of the passage, the wax is caused to attain a controlled consistency such that it of itself forms a plastic wax seal against which the wax product is worked as it is being propelled, the seal moreover preventing channeling or blow-by of the partially deoiled wax through the filter. The working or kneading of the oil-bearing wax, due to relative motion between blades and filter-element, not only frees oil from the interstices of the wax but also presents each particle of oil-bearing wax to the filtering surface, thus affording effective removal of oil. When extruded through its discharge outlet, the wax is substantially oil-free, although it may be thereafter further refined as by sweating or refiltering in the described manner, if a refined wax product is desired. The foots oil filtrate passing through the filtering medium is collected and may be processed for the recovery of the traces of occluded wax passing through the medium as by agitation followed by recycling through the filter if desired.

As many changes could be made in carrying out the above constructions without departing from the scope of the invention, it is intended that all matter contained in the above description or shown in the accompanying drawings shall be interpreted as illustrative and not in a limiting sense.

I claim:

1. A pressure filter adapted for the rapid separation of wax in plastic condition from wax-oil mixtures comprising a filter body provided with an inlet for the material to be filtered and a restricted outlet for the solids separating therefrom, a jacket surrounding said body for circulation of heat transfer medium, a rotary filter element having diverging passages for passage of filtrate through the filter element disposed within and spaced from the filter body to provide an annular space into which the material is fed under pressure and in which the solids collect as they are filtered out, said element being provided with an outlet for the liquid filtrate, means for rotating said element, and means including a member between the filter element and the body closely spaced from said filter element operative on the rotation of said element for cleaning the latter of solids tending to form thereon and for conveying the same to the outlet therefor, said solids outlet being so restricted as to restrict the flow of solids therethrough and form a seal of solids adjacent the solids outlet of a desired consistency and depth to prevent blow-by and permit rapid filtration in continuous operation of the filter.

2. A pressure filter adapted for the rapid separation of wax in plastic condition from wax-oil mixtures comprising a filter body provided with an inlet for the material to be filtered and a restricted outlet for the solids separating therefrom and a jacket for circulation of heat transfer medium, a rotary filter element of circular cross-section disposed within and spaced from the filter body to provide an annular space into which the material is fed under pressure and in which the solids collect as they are filtered out, said element being provided with an outlet for the liquid filtrate, means for rotating said element, a helical blade following the contour of said filter element carried by said filter body and extending into the aforesaid space and being operative upon rotation of the filter element for cleaning said element of the solids tending to form thereon and for conveying the same to the outlet therefor, said solids outlet being so restricted as to restrict the flow of solids therethrough and form a seal of solids adjacent the solids outlet of a desired consistency and depth to prevent blow-by and permit rapid filtration in continuous operation of the filter.

3. A pressure filter adapted for the rapid separation of wax in plastic condition from wax-oil mixtures comprising a filter-body provided with an inlet for the material to be filtered and a restricted outlet for the solids separating therefrom, a cylindrical filter element disposed within and spaced from the filter body to provide an annular space into which the material is fed and in which the solids collect as they are filtered out, said element being provided with an outlet for the liquid filtrate, a helical blade disposed in said space following the contour of said filter element being operative upon rotation of the filter element to clean said filter element of solids collecting thereon and for conveying them to the solids outlet while simultaneously progressively compacting the solids adjacent said solids outlet, said filter body being provided with a jacket for the circulation of a heat transfer medium.

4. A pressure filter adapted for the rapid separation of wax in plastic condition from wax-oil mixtures comprising a filter body provided with an inlet for the material to be filtered and remote from said inlet a restricted outlet for the solids separating from said mixture, a jacket surrounding said body for circulation of heat transfer medium, a cylindrical filter element contained in and spaced from said body to provide an annular space between said inlet and said outlet into which the material to be filtered is fed and in which the solids collect as they are filtered out, said filter element having diverging-walled passages for passage of filtrate through the filter element and an outlet for the liquid filtrate, helical means disposed between said body and said filter element following the contour of said element and being operative upon movement of said element relative thereto to clean solids collecting on the element and to convey said solids to the aforesaid restricted solids outlet while simultaneously compacting said solids adjacent said solids outlet.

ADAM H. GEBAUER.

REFERENCES CITED

The following references are of record in the file of this patent:

UNITED STATES PATENTS

| Number | Name | Date |
| --- | --- | --- |
| 703,683 | Vrooman et al. | July 1, 1902 |
| 894,414 | White | July 28, 1908 |
| 1,000,086 | Goetz et al. | Aug. 8, 1911 |
| 1,054,839 | Hansen | Mar. 4, 1913 |
| 1,084,738 | Hansen | Jan. 20, 1914 |
| 1,624,385 | Berger | Apr. 12, 1927 |
| 1,772,262 | Naugle | Aug. 5, 1930 |
| 1,784,372 | McCaskell | Dec. 9, 1930 |
| 2,146,692 | Tiedman | Feb. 7, 1939 |
| 2,167,322 | Cuno et al. | July 25, 1939 |
| 2,181,404 | Koppitz | Nov. 28, 1939 |

FOREIGN PATENTS

| Number | Country | Date |
| --- | --- | --- |
| 499 | Great Britain | 1889 |
| 7,884 | Great Britain | 1900 |
| 43,777 | Switzerland | Nov. 17, 1908 |
| 430,290 | France | Aug. 5, 1911 |